April 20, 1965     F. P. ZIERDEN     3,179,430
LATHE CHUCK
Filed Jan. 17, 1963     2 Sheets-Sheet 1
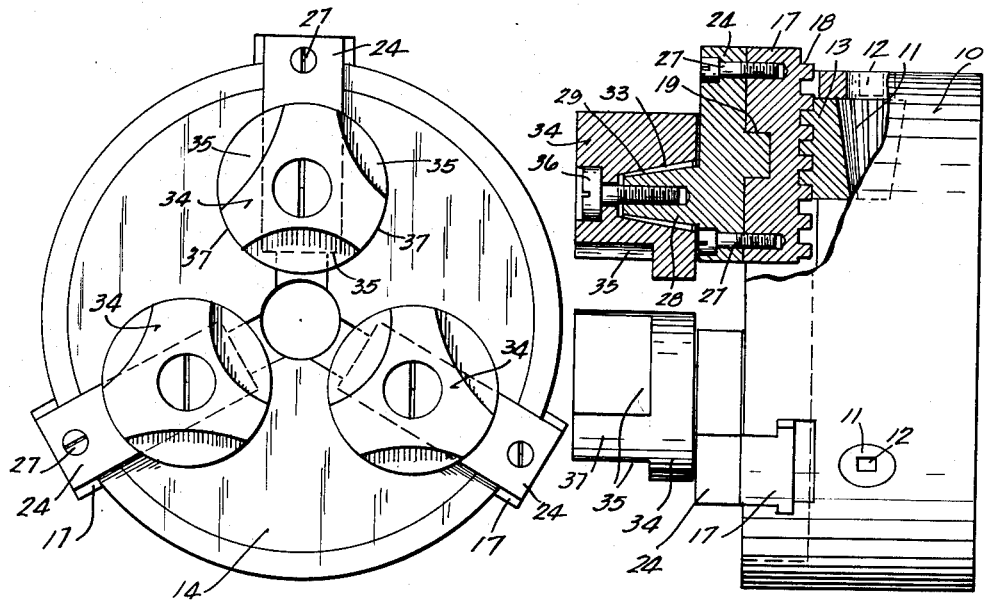
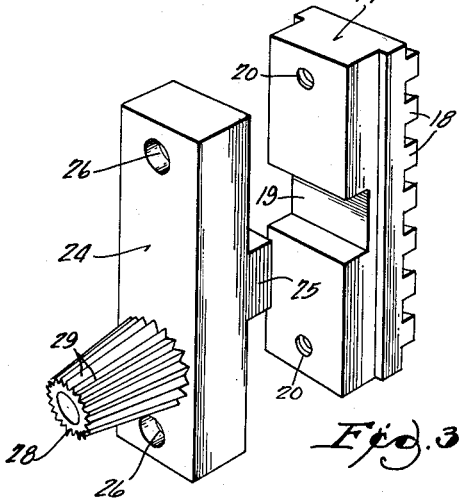
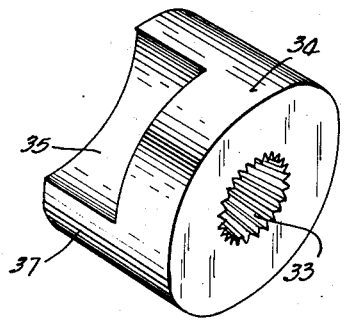
INVENTOR.
FRANK P. ZIERDEN
BY
ATTORNEY April 20, 1965 F. P. ZIERDEN 3,179,430
LATHE CHUCK
Filed Jan. 17, 1963 2 Sheets-Sheet 2
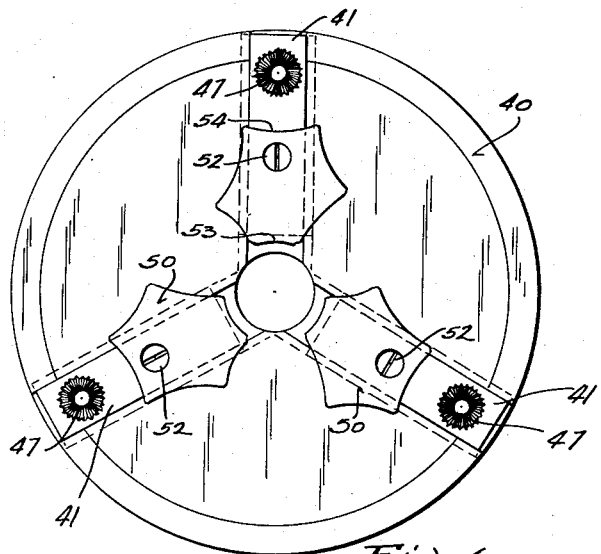
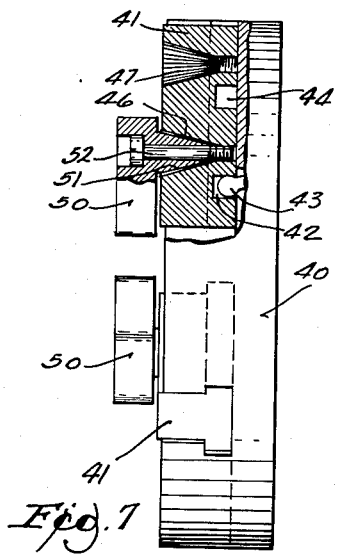
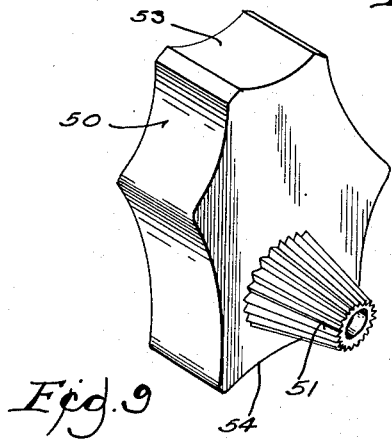
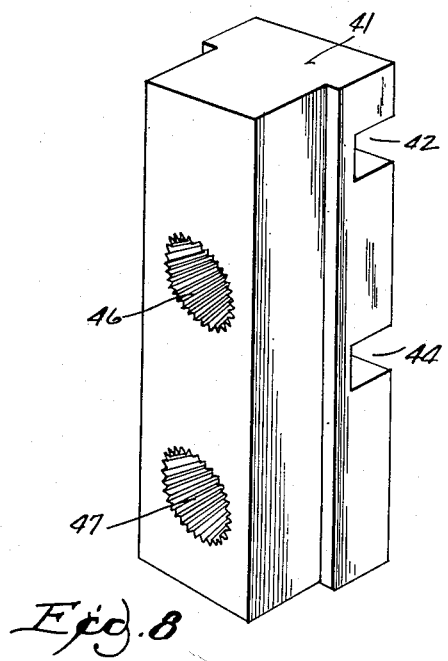
INVENTOR.
FRANK P. ZIERDEN
BY Miles Henninger
ATTORNEY

United States Patent Office 3,179,430
Patented Apr. 20, 1965

3,179,430
LATHE CHUCK
Frank P. Zierden, 3709 E. Allerton Ave., Cudahy, Wis.
Filed Jan. 17, 1963, Ser. No. 252,093
5 Claims. (Cl. 279—123)

This invention relates to improvements in chucks and chuck jaws for use on machine tools and the like for holding a workpiece to be turned.

Machine tools such as lathes use adjustable means for holding a workpiece to be turned, and which are known as a chuck head or chuck. A disk-like chuck head driven by the lathe, has adjustable jaws on radii thereof for gripping the workpiece, and various adjusting means are now in use to act on the jaws to move them simultaneously toward or away from the workpiece which is to be centered in the chuck. In one construction, a scroll or spiral is rotatable by any one of several pinions accessible from the side of the chuck head and engaging spiral teeth in a part of the jaw structure. In another construction, the rod of an air actuated piston swings toggles or bell cranks engaged at one end in a groove in one part of the several jaws of a chuck head. In either above case, the adjusting means slides all the jaws of the chuck head toward or away from the head center on radii of the head along T-slots opening from the face thereof. In a third construction, the jaws are individually operated by screws accessible from the periphery of the chuck head.

In the present invention, each jaw structure has one piece formed with a tapered pintle and has another piece formed with a socket tapered to seat on the pintle and the pintle and socket surfaces have corresponding surfaces (not surfaces of revolution) for holding the parts against rotation. The one jaw piece is movable only radially in a T-slot in the chuck head while the other jaw piece is rotational relative to the first piece, but seats in definite positions thereon. The second piece has its side above the chuck face cut to provide gripping surfaces at various distances from the pintle center about which it rotates to grip workpieces of several sizes within small ranges of movement of the first jaw piece.

In adapting the present invention to an existing scroll type chuck, the first jaw part is movable in the T-slots to engage the scroll which is on one side of a rotatable wheel and a second jaw part seats on the first part and has a fluted pintle projecting therefrom while a third jaw part has a fluted socket and is formed with the workpiece gripping surfaces. In adapting the present invention to an air operated chuck, the jaw piece fitting into and movable in the chuck head T-slot, is provided with two fluted conical sockets at different distances from the chuck head center. The pintle is now on the gripping jaw piece and may be received in either one of the sockets in the base jaw piece. Thus the present structure also provides a range of different gripping surfaces for each set of gripping jaws and such range is available at two different locations which doubles the number of workpieces which may be held in a given set of gripping jaws as compared to the first modification hereof. So long as the pintle and socket are correspondingly tapered and sized and have correspondingly flat or fluted or otherwise shaped surfaces to prevent undesired rotational movement of the gripping jaw, the particular shape of the pintle and socket and of the engaging surfaces thereof are immaterial. The pintle and socket may have a shape other than a cone provided they are tapered so that the socketed part may seat firmly on the pintle part. The engaging surfaces of the pintles and sockets may be flats, flutes of angular or rounded shape, teeth of any shape or the like so long as the gripping jaw may be manually rotated into a number of positions equal to the number of gripping surfaces. The pintle and socket are preferably conical as that shape can readily be made to a uniform taper and the seating surfaces are preferably such that there is no tendency for rotation of the socket part relative to the pintle part and the socketed part may be kept in seated position by a simple screw.

In the drawings:

FIG. 1 is a plan view of a chuck of the "scroll" type with the present jaw structure adapted to make use of an existing part of its jaws.

FIG. 2 is an elevation of a device of FIG. 1 with a portion of the chuck head, and the present jaw structure shown in cross section.

FIG. 3 is a perspective of a member herein called a "base jaw."

FIG. 4 is a perspective of a member herein called an "adapter jaw" which seats on the base jaw and provides a seat for another jaw part.

FIG. 5 is a perspective of a member seating on the pintle jaw and having surfaces for gripping a workpiece and which is called a "gripping jaw."

FIG. 6 is a plan view of a chuck of the "air-chuck" type with a form of the present chuck jaws adapted to such air-operated chuck.

FIG. 7 is an elevation of the chuck and jaw structure of FIG. 6, with portion thereof in cross section.

FIG. 8 is a perspective of a member herein called the "base jaw," and

FIG. 9 is a perspective of one form of gripping jaw used with the base jaw of FIG. 8.

Referring to drawings by numbered parts, 10 generally designates the body of a chuck of the scroll type in which a number of pinion gears 11 each have a socket 12 accessible from the periphery of the head for receiving a crank by which the pinions are severally turned. The several pinions engage with teeth on one side of an annular part 13 (herein called a wheel), which has a spiral or scroll formed on the side thereof opposite the gear teeth. The chuck head 10 has a face plate 14 in which are formed a number of T-slots running through the periphery of the chuck and which severally receive a jaw part 17 forming the base for another jaw part or parts. A surface of base jaw 17 has spiral teeth 18 to engage the scroll of wheel 13 so that the base jaw moves toward or away from the center of the chuck head as one of the pinions 11 rotates the scroll wheel 13. Base jaw 17 has a groove or keyway 19 in the upper surface and has a number of threaded holes 20 therein.

An adapter jaw 24 is formed with a key 25 to fit in the keyway 19 and with holes 26 matching the holes 20 so that screws 27 may hold the chuck parts 17 and 24 together. A projection 28 from jaw part 24, is made as a truncated cone and the conical surface has flutes therein in the form of V-shaped grooves 29 of uniform size. Projection 28 fits into a socket 33 in a generally cylindrical block 34 which is the jaw for gripping the workpiece. Cut-outs 35 in the gripping jaw 34 surface vertical to the chuck face, are of different shape such as e.g. arcs of different shape such as e.g. arcs of different radius. Each gripping jaw 34 is seated on the pintle 28 of the adapter jaw 24 by meshing the pintle flutes 29 with the flutes in the gripping jaw socket 33, and is held in seated position by a screw 36.

In the above jaw structure, the base jaw is an existing part of a scroll type chuck and is used without change for the reason that it is cheaper and easier to make an adapter piece with the pintle thereon than it is to make a base jaw piece with both scroll teeth and a pintle. However, the above base jaw and adapter jaw may obviously be combined into a single part as shown in FIGS. 6–9 described below. The number of flutes used depends upon the minimal movement per rotation desired of the gripping jaw and the maximum number of flutes which can be conveniently formed in the pintle and socket surfaces. Obviously, the pintle of adapter jaw 24 may be placed anywhere between the screw holes 26.

In use of a scroll type chuck head shown in FIGS. 1–5, one of the pinions 11 is turned to rotate scroll wheel 13 which moves the base jaws 17 along their respective slots to approximately the position at which the interior space defined by the gripping jaws, approaches the size of the workpiece. Then the gripping jaws 34 are released from the adapter jaws 24 and rotated to bring those cut-outs 35 to face the space within the gripping jaws, which most nearly fit the particular workpiece. The workpiece is then rested on two of the gripping jaws and a pinion 11 is turned to move all of the jaws simultaneously toward one another until the workpiece is securely held. Obviously, workpieces of different diameter require the use of different cut-outs on the gripping jaws so that the cut-outs are made on different radii until all available surface of the gripping jaw 34 is used. In FIG. 1, three cut-outs 35 are shown and there are three jaw surfaces 37 remaining on which cut-outs can be made. The number of cut-outs depends on the size of the several cut-outs and on how deep they must be made along the axis of the jaw socket. In some instances two or more cut-outs may be made in the same gripping jaw surface portion extending vertically from the chuck face.

In the air chuck shown in FIGS. 6–9, a chuck head 40 again has a number of T-slots on radii of the head. Each of the T-slots receive a base jaw portion 41 of generally rectangular shape with a groove 42 in one side. The groove receives one end of a bell crank 43 of which the other end is engaged with the rod of an air-operated piston as is well known. Thus operation of the air piston causes simultaneous movement of all of the base jaws 41 toward or away from the center of the chuck head.

Each base jaw 41 has two conical sockets 46 and 47 therein with V-shape flutes in the socket surfaces for alternately receiving a pintle on another jaw part. The sockets 46 and 47 are at different distances from the ends of base jaw 41 and from the chuck center, so that each base jaw provides for two ranges of workpiece sizes which may be held by the present jaw structure. The other jaw part 50 has a pintle 51 thereon which can be seated either in socket 46 or 47 and held therein as by screws 52 and which are workpiece gripping jaws. Because the sockets 46 and 47 are both relatively close to the end of the base jaw 41, the gripping jaws 50 may have an oblong form with a pintle placed toward one end thereof which has the effect of making available gripping surfaces such as 53 and 54 which are of maximum different radii as well as other surfaces between such maxima.

The usual air chuck has only approximately ⅜″ travel per jaw so that the operator initially sets the base jaws 41 at their greatest opening. Then a selection is made of the gripping surfaces most suitable for the particular workpiece and the gripping jaws pintles are seated in the socket which brings the selected gripping surfaces closest to the position required for holding the workpiece. If the selection of gripping surfaces has been proper, the travel required for gripping the workpiece is less than ⅜″ and movement of the air pistons will effectively hold the workpiece. The base jaw 41 may also be made reversible and a second bell crank groove 44 may be provided near the socket 47 so that the sockets 46 and 47 are differently positioned relative to the center of the chuck even when the jaws 41 are in exactly the same position as shown e.g. in FIG. 7. Reversing of base jaws 41 of course requires considerable dismantling and reassembling of the chuck and such reversing is economical only when the same air chuck must be used for a range of workpiece sizes not within the range available by the previous placement of the base jaws.

The use of fluted pintle and socket surfaces makes possible rotation of the gripping jaw upon release of screw 52 only sufficiently to let the V-grooves of one part clear the other part. Thus, there is no danger of dropping a gripping jaw and the set up time is reduced. Special note is made of the relatively long arcs used as gripping surfaces so that workpieces are gripped over considerable lengths. Thus, there is no danger that a gripping jaw may rock because of play between the base jaw and its T-slot.

The usual chuck heads use jaws including a first jaw and gripping jaws which may have surfaces for external or internal gripping (or may be reversible). Each set of the known gripping jaws is usable only for gripping a few sizes of workpiece so that a number of sets of gripping jaws are kept on hand to make a given chuck head useful for a fair range of sizes of workpiece. When workpieces are of a size which cannot be held by one set of gripping jaws, such jaws must be removed and another set of gripping jaws mounted on the master jaw. Removal of one set of gripping jaws and replacing them with another set of such jaws is in itself time consuming even when the proper gripping jaws are available at the machine instead of only in the tool crib.

With the present construction, much of the prior loss of time in changing chuck jaws and in going to tool cribs, is eliminated and a lathe may be kept in production use much more continuously. The present chuck jaws require partial release of only one screw per jaw and turning of the gripping jaw and each set of gripping jaws is capable of handling as many workpiece sizes as the number of cut-outs which can be made in a jaw. Obviously the number of gripping surface cut-outs which may be made on a gripping jaw of the present construction, is limited only by use of the total surface area for cut-outs and cut-outs may be made on various levels as is done for the usual gripping jaws.

I claim:

1. A chuck for releasibly holding different size work pieces for rotation on a machine tool and comprising a chuck head with plural T-slots in and radially of the face thereof, a base jaw in and movable along each of the T-slots, means for simultaneously moving the base jaws along their T-slots, gripping jaws severally mounted on and connected with the base jaws for movement therewith as a unit and for manual rotation of the gripping jaws relative to the base jaws for presenting different surfaces engageable with a work piece, one of the jaws of each unit having a pintle thereon for entry into a socket in the other jaw of the unit, the pintle and the socket having correspondingly tapered surfaces fluted for inter-engaging seating on one another, and manually operable means for holding the pintle and socket flutes seated on and releasing the flutes from one another for rotation of the gripping jaws while connected with the base.

2. The chuck of claim 1 in which the gripping jaws have cut-outs of different depths and on different radii to provide arcuate surfaces for engagement of various points thereon with different work pieces, and the pintle and socket flutes are a relatively large multiple of the number of jaw cut-outs for variability in adjustment of gripping jaws engagement with work pieces.

3. The chuck of claim 1 in which a single screw engages the base jaw and bears on the gripping jaw for holding the pintle and socket flutes seated on one another and releasing the same from seated position while retaining connection of the jaws with one another.

4. The chuck of claim 1 in which a plurality of sockets are formed in the said other jaw of the unit, the sockets being in pairs along the radius of the chuck head at different distances from the center thereof for individual variation of gripping jaw position relative to the chuck center.

5. The chuck of claim 4 in which the pintle is off center of one jaw for individual variation of gripping jaw position relative to the chuck center.

References Cited by the Examiner

UNITED STATES PATENTS

| | | | |
|---|---|---|---|
| 2,345,910 | 4/44 | Fawcett | 287—53 |
| 2,896,958 | 7/59 | Strauss | 279—123 |
| 2,950,117 | 8/60 | Walmsley | 279—123 |

FOREIGN PATENTS 415,993  11/46  Italy.

FRANK SUSKO, Primary Examiner.
ROBERT C. RIORDON, Examiner.